(12) United States Patent
Suzuki et al.

(10) Patent No.: US 7,635,931 B2
(45) Date of Patent: Dec. 22, 2009

(54) STEPPING MOTOR

(75) Inventors: Yuzuru Suzuki, Kitasaku-gun (JP); Takayuki Yamawaki, Kitasaku-gun (JP); Masaki Kagawa, Kitasaku-gun (JP); Hiroyuki Furusaki, Kitasaku-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 203 days.

(21) Appl. No.: 12/000,415

(22) Filed: Dec. 12, 2007

(65) Prior Publication Data
US 2008/0150399 A1  Jun. 26, 2008

(30) Foreign Application Priority Data
Dec. 22, 2006  (JP) .............................. 2006-346059

(51) Int. Cl.
*H02K 37/14* (2006.01)
(52) U.S. Cl. .............................. 310/49.37; 310/40 MM
(58) Field of Classification Search .............. 310/49.23, 310/49.33, 49.36–49.41, 40 MM
See application file for complete search history.

(56) References Cited

U.S. PATENT DOCUMENTS

| 4,406,958 | A | * | 9/1983 | Palmero et al. | ......... | 310/49.32 |
|---|---|---|---|---|---|---|
| 4,642,494 | A | * | 2/1987 | Lundin et al. | ......... | 310/49.53 |
| 4,983,867 | A | * | 1/1991 | Sakamoto | ................ | 310/49.37 |
| 5,177,384 | A | * | 1/1993 | Furuki | .................... | 310/49.16 |
| 5,291,084 | A | * | 3/1994 | Shiotsuki et al. | ......... | 310/49.16 |
| 5,410,200 | A | * | 4/1995 | Sakamoto et al. | ........ | 310/49.32 |
| 5,691,583 | A | * | 11/1997 | Suzuki et al. | ............ | 310/49.13 |
| 5,770,900 | A | * | 6/1998 | Sato et al. | ................ | 310/49.13 |
| 6,031,304 | A | * | 2/2000 | Suzuki et al. | ............ | 310/49.08 |
| 6,486,576 | B1 | * | 11/2002 | Yura et al. | ................ | 310/49.24 |
| 6,703,728 | B1 | * | 3/2004 | Goubely et al. | .......... | 310/49.37 |
| 6,809,438 | B2 | * | 10/2004 | Suzuki et al. | ............ | 310/49.36 |
| 6,873,068 | B2 | * | 3/2005 | Nishimura | ............... | 310/49.36 |
| 7,164,216 | B2 | * | 1/2007 | Shimoyama | ............. | 310/49.32 |
| 2003/0168922 | A1 | | 9/2003 | Nishimura | | |

FOREIGN PATENT DOCUMENTS

| JP | A-10-225089 | 8/1998 |
|---|---|---|
| JP | A-2003-244922 | 8/2003 |
| JP | A-2006-254556 | 9/2006 |
| JP | A-2006-254557 | 9/2006 |

* cited by examiner

*Primary Examiner*—Tran N Nguyen
(74) *Attorney, Agent, or Firm*—Oliff & Berridge, PLC

(57) ABSTRACT

In a stepping motor including two stators and a rotor having two magnets, three dimensional relations, specifically a relation of Lm/Ls, another relation of d/2Lm, and still another relation d/D, are optimally determined while satisfying their respective ranges: $0.35 \leq Lm/Ls \leq 0.45$; $0.77 \leq d/2Lm \leq 1.10$; and $d/D \leq 0.45$, where Lm is the axial dimension of the magnet, Ls is the axial dimension of the stator, d is the outer diameter of the magnet, and D is the outer diameter of the stator, whereby a space for accommodating a sufficient number of coil turns is secured maximally in the stator, and the inertia and the cogging torque of the rotor are reduced maximally, which leads to producing the highest possible torque at a high rotation speed range required.

2 Claims, 7 Drawing Sheets

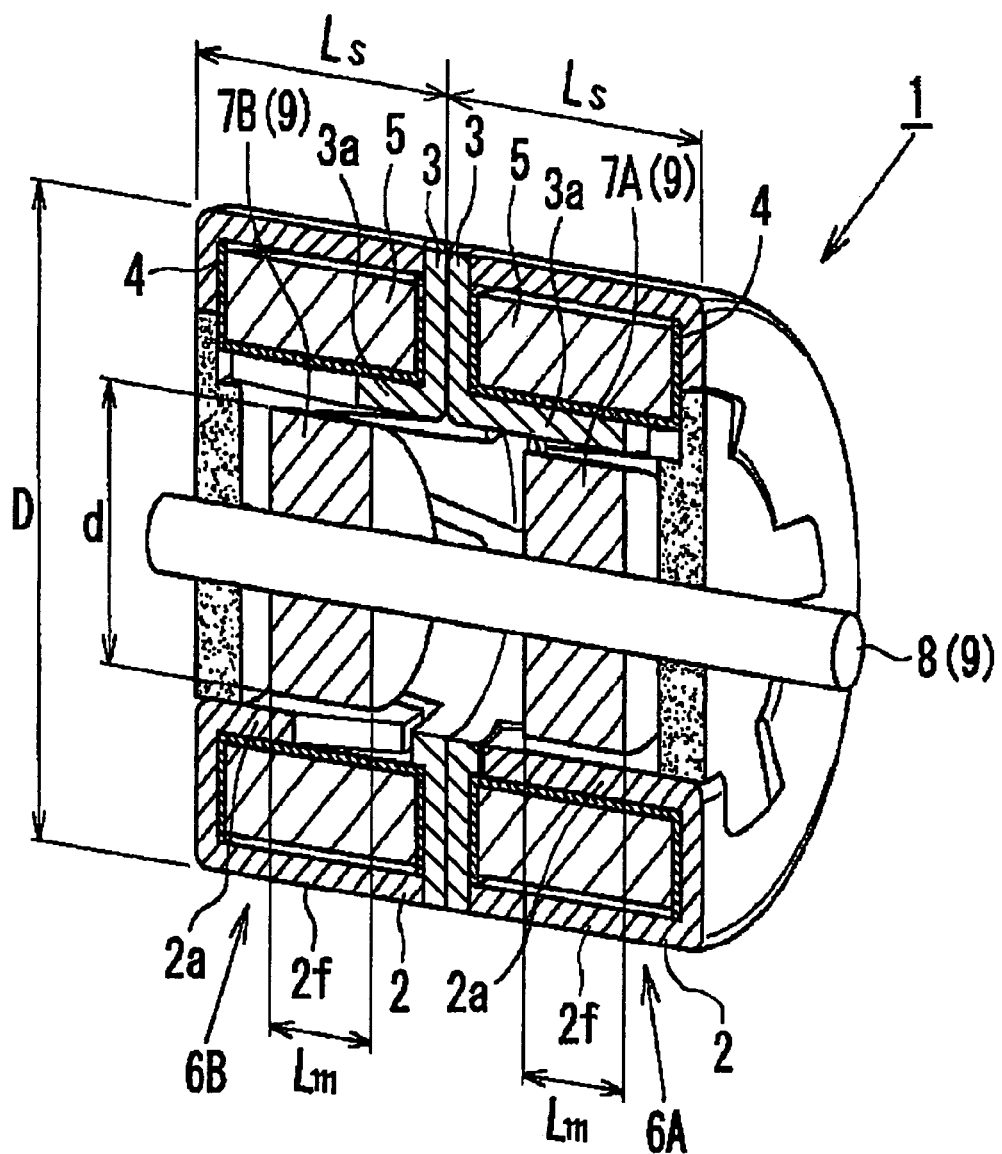

STEPPING MOTOR

BACKGROUND OF THE INVENTION

1. Field of the Invention

The present invention relates to a PM stepping motor, and more particularly to a PM stepping motor with limited size.

2. Description of the Related Art

FIG. 5 shows an example of a typical PM stepping motor (hereinafter referred to as "stepping motor" as appropriate). A stepping motor of FIG. 5 generally includes two stators 6A and 6B, and a rotor 9.

Each of the two stators 6A and 6B includes an outer yoke 2 having a cylindrical outer frame 2f and a plurality of pole teeth 2a, an inner yoke 3 having a plurality of pole teeth 3a intermeshing with the plurality of pole teeth 2a of the inner yoke 2 on the same circumferential plane, and a bobbin 4 having a coil 5 therearound and housed in an annular hollow space formed by the outer yoke 2 and the inner yoke 3. The two stators 6A and 6B thus structured are coupled to each other back to back.

The rotor 9 includes a shaft 8 and two magnets 7A and 7B disposed on the shaft 8 axially separate from each other, and is rotatably disposed inside the stators 6A and 6B such that the outer circumferences of the two magnets 7A and 7B oppose the pole teeth 2a and 3a of the stators 6A and 6B with a small air gap therebetween.

In recent years, a photographing or filming equipment, such as a digital or video camera is becoming widely popular, and the performance of an automatic focusing mechanism for use with lenses in such the equipment has been remarkably enhanced while the mechanism dimension is significantly reduced. Under such the circumstances, there is an increasing demand for a small stepping motor with an outer diameter of 10 mm or less as driving means for such the automatic focusing mechanism (refer to, for example, Japanese Patent Application Laid-Open No. 2006-254557).

The above described stepping motor with a limited diameter is disadvantageous in terms of torque production but nevertheless is required to produce a necessarily ample output torque at a high rotation speed range. For example, a typical stepping motor for use with an automatic focusing mechanism for a digital camera, which has an outer diameter of 10 mm or less, generates a pull-in torque T of 1.2 g-cm or more at a frequency (rotation speed) f of 1000 pps, and it is desired for such the small stepping motor to produce an equivalent or larger torque even at a higher frequency f, e.g. 2500 pps, in order to assure a high speed response.

SUMMARY OF THE INVENTION

The present invention has been made in light of the above circumstances, and it is an object of the present invention to provide a stepping motor having a limited outer diameter, which, under the restriction, is adapted to produce the highest possible torque at a high frequency (high rotation speed).

In order to achieve the object described above, according to an aspect of the present invention, a stepping motor includes: two stators which are configured identically with each other, put together back to back, and which each include an outer yoke having a cylindrical outer frame and a plurality of pole teeth, an inner yoke having a plurality of pole teeth intermeshing with the plurality of pole teeth of the outer yoke on a same circumferential plane, and a bobbin having a coil therearound and housed in an annular hollow space formed by the outer yoke and the inner yoke; and a rotor which includes a shaft, and two magnets configured identically with each other and disposed on the shaft axially separate from each other, and which is rotatably disposed inside the two stators such that outer circumferences of the two magnets oppose the pole teeth of the two stators with a small air gap therebetween. The stepping motor described above is structured such that a first dimensional relation of Lm/Ls ranges between 0.35 inclusive and 0.45 inclusive, a second dimensional relation of d/2Lm ranges between 0.77 inclusive and 1.10 inclusive, and a third dimensional relation of d/D ranges below 0.45 inclusive, where Lm is the axial dimension of each magnet, Ls is the axial dimension of each stator, d is the outer diameter of the magnet, and D is the outer diameter of the stator.

In the aspect of the present invention, the outer diameter D of the stator may be 10 mm at most.

The stepping motor structured as described above under the restricted outer dimension is adapted to produce the highest possible torque at a high rotation speed range required.

BRIEF DESCRIPTION OF THE DRAWINGS

FIG. 1A is a perspective cross sectional view of a stepping motor, adapted to explain three dimensional relations according to the present invention.

DETAILED DESCRIPTION OF THE INVENTION

An exemplary embodiment of the present invention will hereinafter be described with reference to the accompanying drawings.

Figure 1B:
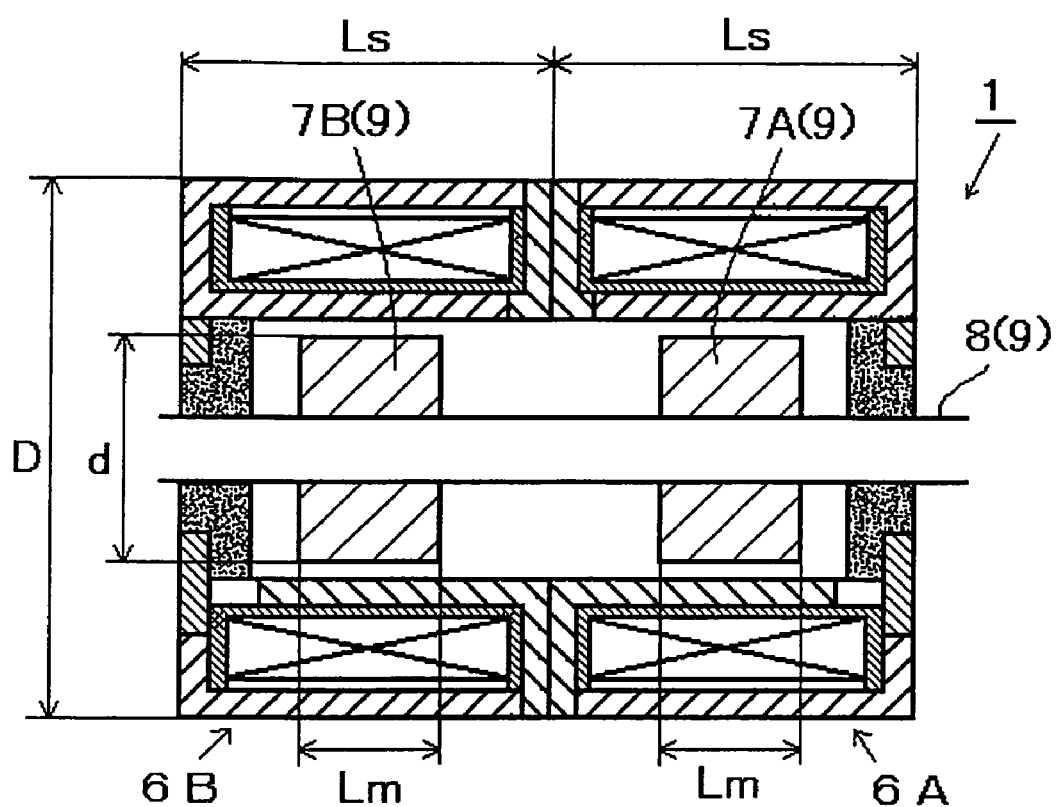
FIG. 1B is a cross sectional view of the stepping motor of FIG. 1A, schematically arranged for explanation convenience.
Figure 5:
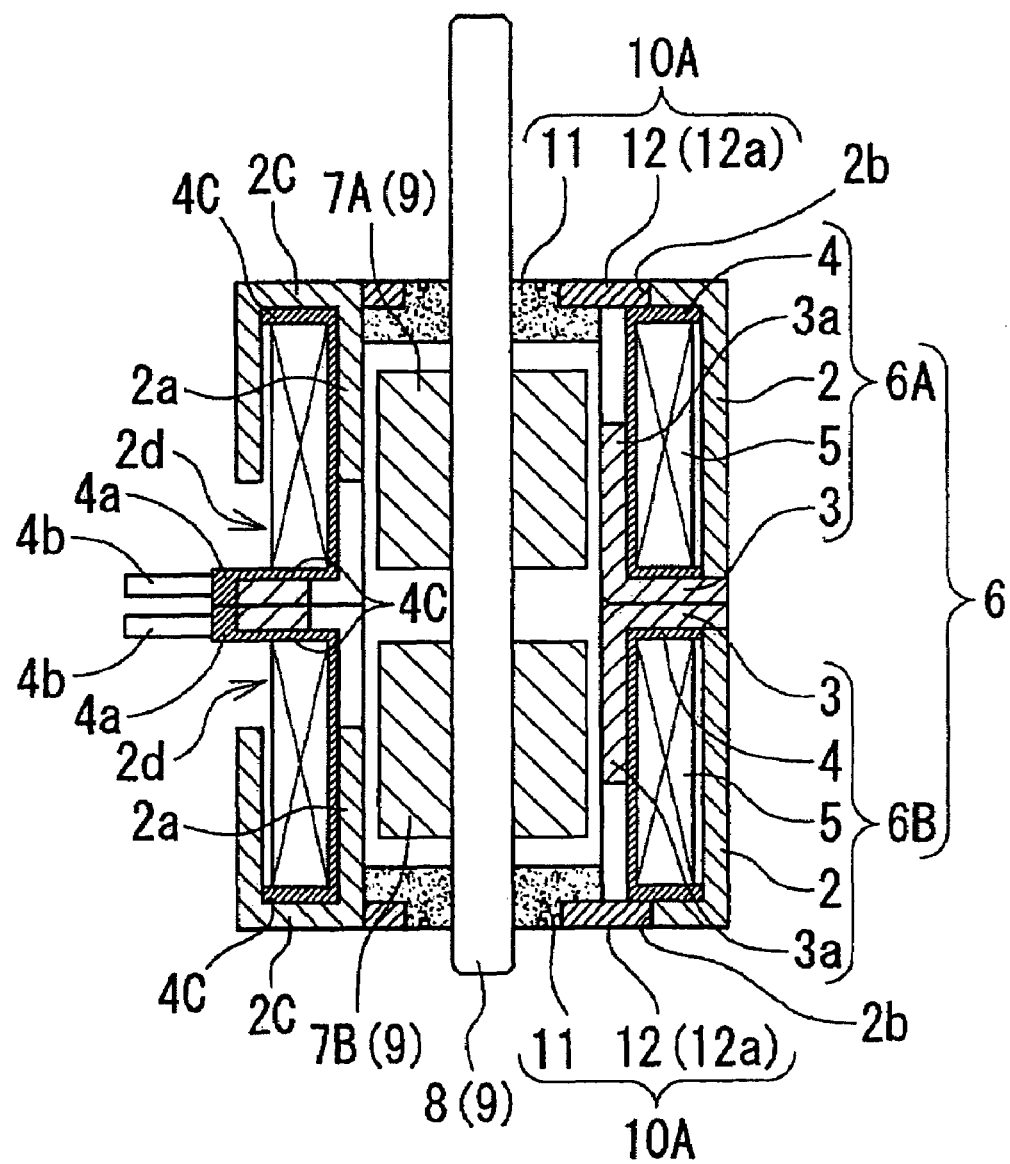
FIG. 5 is a cross sectional view of a typical stepping motor.

Referring to FIG. 1A, a stepping motor 1 according to an embodiment of the present invention, though possibly exhibiting variation in the dimensions of some component parts and/or their dimensional relations, is structured basically the same as the typical stepping motor described herein earlier with reference to FIG. 5, and corresponding components parts in FIG. 1A are denoted by the same reference numerals employed in FIG. 5.

The stepping motor 1 includes two stators 6A and 6B, and a rotor 9. Each of the two stators 6A and 6B includes an outer yoke 2 having a cylindrical outer frame 2f and a plurality of pole teeth 2a, an inner yoke 3 having a plurality of pole teeth 3a intermeshing with the plurality of pole teeth 2a of the outer yoke 2 on the same circumferential plane, and a bobbin 4 having a coil 5 therearound and housed in an annular hollow space formed by the outer yoke 2 and the inner yoke 3. The two stators 6A and 6B thus structured are coupled to each other back to back. The rotor 9 includes a shaft 8 and two magnets 7A and 7B disposed on the shaft 8 axially separate from each other, and is rotatably disposed inside the stators 6A and 6B such that the outer circumferences of the two magnets 7A and 7B oppose the pole teeth 2a and 3a of the stators 6A and 6B with a small air gap therebetween.

The two stators 6A and 6B are structured identically with each other and each have an axial dimension Ls and an outer diameter D which specifically is the outer diameter of the cylindrical outer frame 2f and which represents the outer diameter of the stepping motor 1, and the two magnets 7A and 7B are structured identically with each other and each have an axial dimension Lm and an outer diameter d. A stepping motor of the present invention is supposed to have its outer diameter dimensioned 10 mm or smaller, and specifically in the present embodiment the outer diameter D of the stator 6A/6B, that is the outer diameter of the stepping motor 1, is set at 6 mm.

In the stepping motor 1 described above, three of dimensional relations, which are: a first relation between the axial dimension Lm of the magnet 7A/7B and the axial dimension Ls of the stator 6A/6B; a second relation between the outer diameter d of the magnet 7A/7B and the axial dimension Lm of the magnet 7A/7B; and a third relation between the outer diameter d of the magnet 7A/7B and the outer diameter D of the stator 6A/6B, have their ranges determined as described below so as to produce the highest torque available at a specific high rotation speed under the restriction that the outer diameter D of the stator 6A/6B has an upper limit of 10 mm.

The first relation ranges: $0.35 \leq Lm/Ls \leq 0.45$, the second relation ranges: $0.77 \leq d/2Lm \leq 1.10$, the third relation ranges: $d/D \leq 0.45$, and the stepping motor 1 is structured to satisfy all the ranges of these three relations. Specifically, in the stepping motor 1 in which the stator 6A/6B has its outer diameter D set at 6 mm as described above, the axial dimension Ls of the 6A/6B is 3.75 mm, the outer diameter d of the magnet 7A/7B is 2.6 mm, and the axial dimension Lm of the magnet 7A/7B is 1.5 mm, whereby the above three relations Lm/Ls, d/2Lm and d/D are figured at 0.40, 0.86 and 0.43, respectively, thus falling within the ranges described above. In this connection, the stator 6A/6B in the embodiment is made of a steel sheet having a thickness of 0.3 mm.

Description will now be made on the grounds for taking the three relations into consideration with reference to FIGS. 2A to 2D by comparing with the stepping motor 1 of FIGS. 1A/1B according to the present embodiment described above.

Figure 2A:
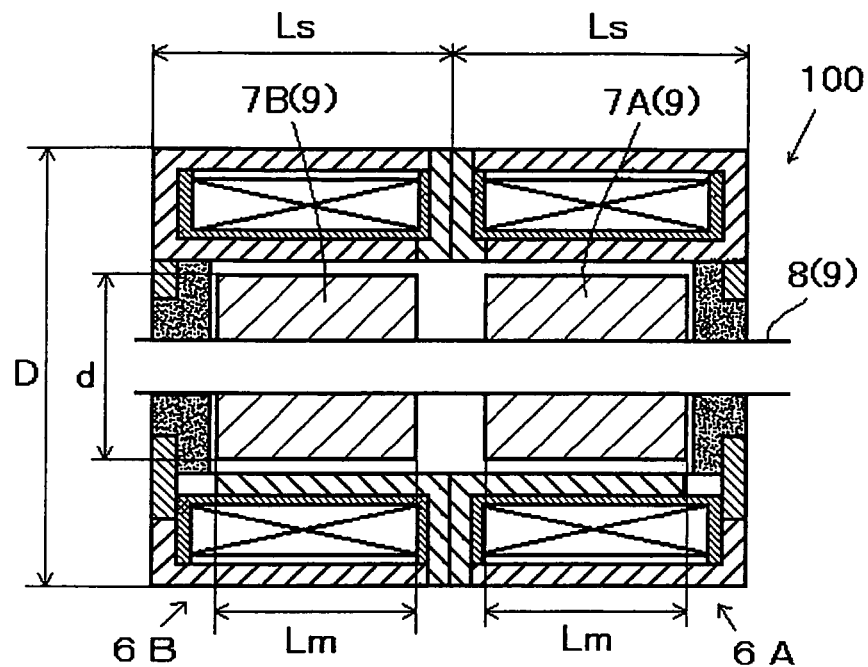
FIGS. 2A to 2D are cross sectional views of stepping motors as comparative examples for demonstrating justifications of taking the three dimensional relations into consideration.

Referring first to FIG. 2A, a typical stepping motor 100 as a first comparative example has the same Ls, d and D as the stepping motor 1, but has a larger Lm than the stepping motor 1 such that the first relation "Lm/Ls" and the second relation "d/2Lm" are caused to depart from the respective ranges stipulated above. The stepping motor 100 provides an increased driving force but has its magnet 7A/7B exhibiting an increased inertia compared to the stepping motor 1, which results in difficulty in starting rotation at a high rotation speed range (high frequency).

Figure 2B:
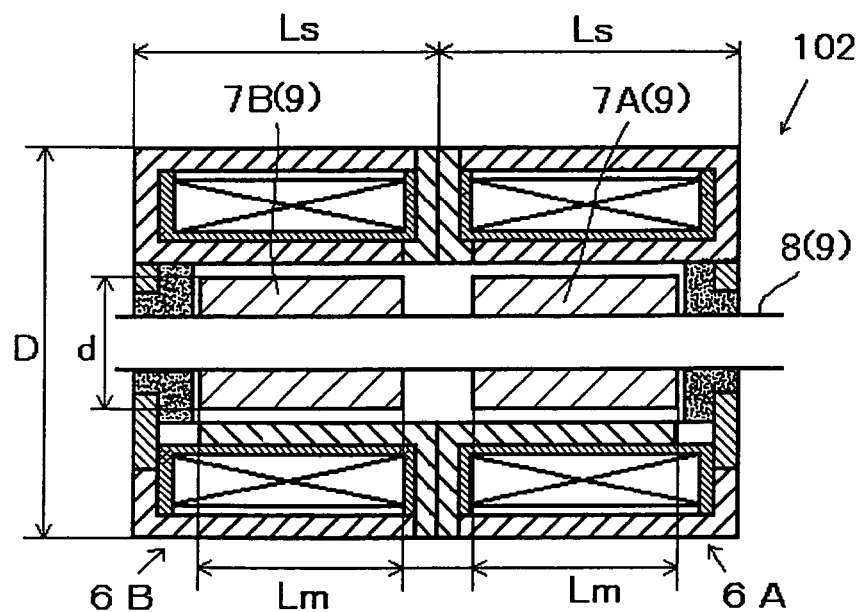

Referring now to FIG. 2B, a typical stepping motor 102 as a second comparative example has the same Ls and Lm as the aforementioned stepping motor 100, but has a smaller outer diameter d than the stepping motor 100 thus enabling its magnet 7A/7B to have a reduced inertia compared to the stepping motor 100. This structure, however, decreases the magnetic energy of the magnet 7A/7B, and consequently degrades the motor characteristics. Also, the wire size of the magnetizing tool for the magnet 7A/7B with the decreased outer diameter d is reduced, and a diminished current is allowed to flow in the wire, which results in difficulty in magnetizing the magnet 7A/7B. In this connection, for the purpose of reducing the inertia of a magnet, the magnet 7A/7B of the aforementioned stepping motor 100 of FIG. 2A may be constituted by a magnet which has its weight reduced by lowering density rather than by reducing its outer diameter d, but since magnetic characteristics are proportionally related to magnet density, the magnetic energy of such the magnet of a lower density is inevitably decreased thus deteriorating the motor characteristics.

Figure 2C:
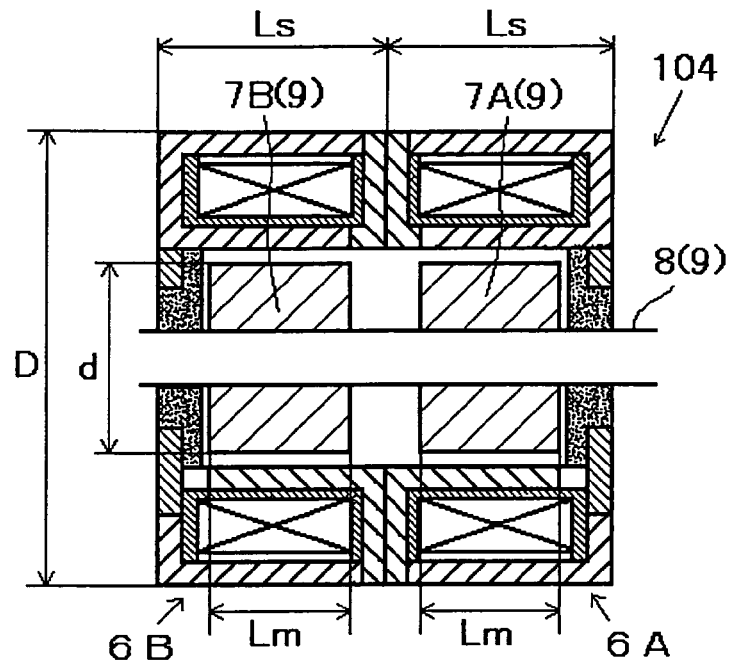

Referring then to FIG. 2C, a typical stepping motor 104 as a third comparative example has the same Lm, d and D as the stepping motor 1 of FIGS. 1A/1B, but has a smaller Ls than the stepping motor 1 such that the first relation "Lm/Ls" is caused to depart from the range stipulated above. This structure forces the winding space in the stator 6A/6B to be decreased thus limiting its magnetic force, which results in inadequate torque.

Figure 2D:
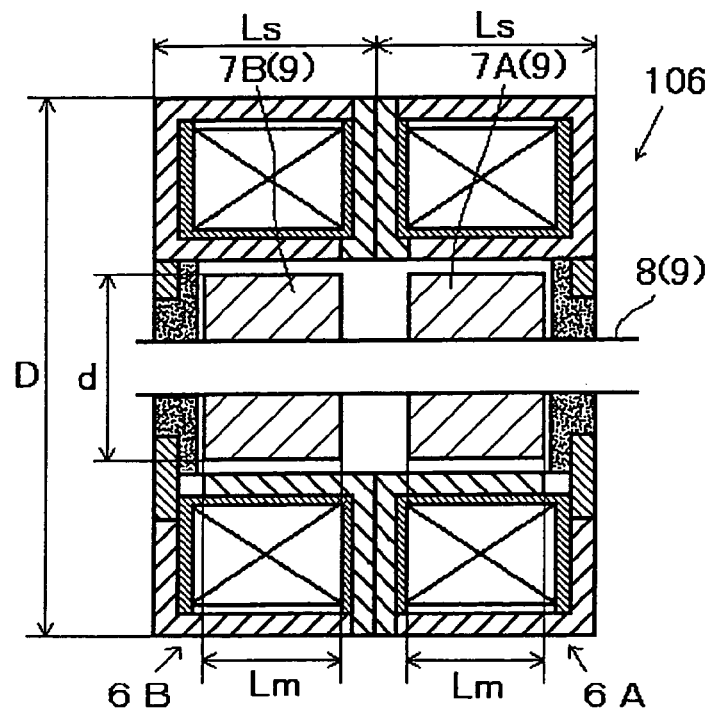

And, referring to FIG. 2D, a typical stepping motor 106 as a fourth comparative example has the same Lm and d as the stepping motor 1, but has a smaller Ls and a larger D than the stepping motor 1 such that the first relation "Lm/Ls" and the third relation "d/D" are caused to depart from the respective ranges stipulated above. The stepping motor 106, which has an increased outer diameter D compared to the stepping motor 104 of FIG. 2C, is advantageous in providing a larger winding space than the stepping motor 104 thereby enhancing motor characteristics, but may have an increased difficulty in meeting a limited outer diameter D of 10 mm or less.

Description will now be made on the motor characteristics of the stepping motor 1 according to the present embodiment with reference to FIGS. 3A to 3C, and 4.

Figure 3A:
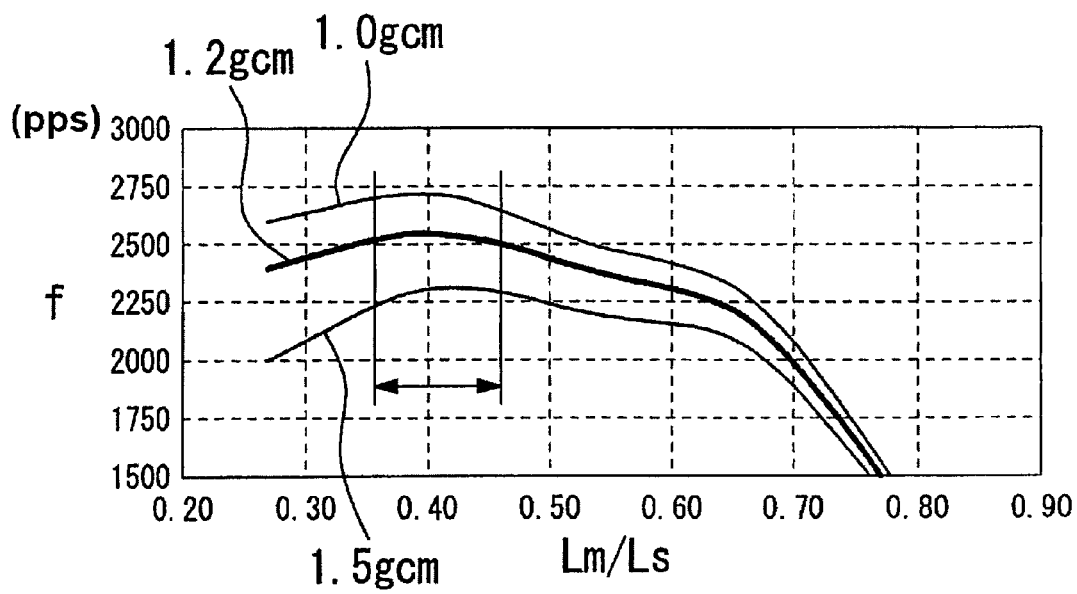
FIGS. 3A to 3C are graphs of motor characteristics by the stepping motor according to the embodiment of the present invention.

FIG. 3A shows torque (pull-in torque) availability with respect to driving frequency as a function of the dimensional relation "Lm/Ls". As shown in FIG. 3A, at the first dimensional relation "Lm/Ls" ranging between 0.35 inclusive and 0.45 inclusive, a pull-in torque of 1.2 g-cm can be duly achieved at a high rotation speed by a frequency of 2500 pps, and at this particular range of the dimensional relation "Lm/Ls" a pull-in torque of 1.0 g-cm can be achieved by a frequency exceeding 2500 pps. Further, at the aforementioned range of the dimensional relation "Lm/Ls" between 0.35 inclusive and 0.45 inclusive, a pull-in torque of 1.5 g-cm can be achieved by a frequency of 2200 pps and higher.

Figure 3B:
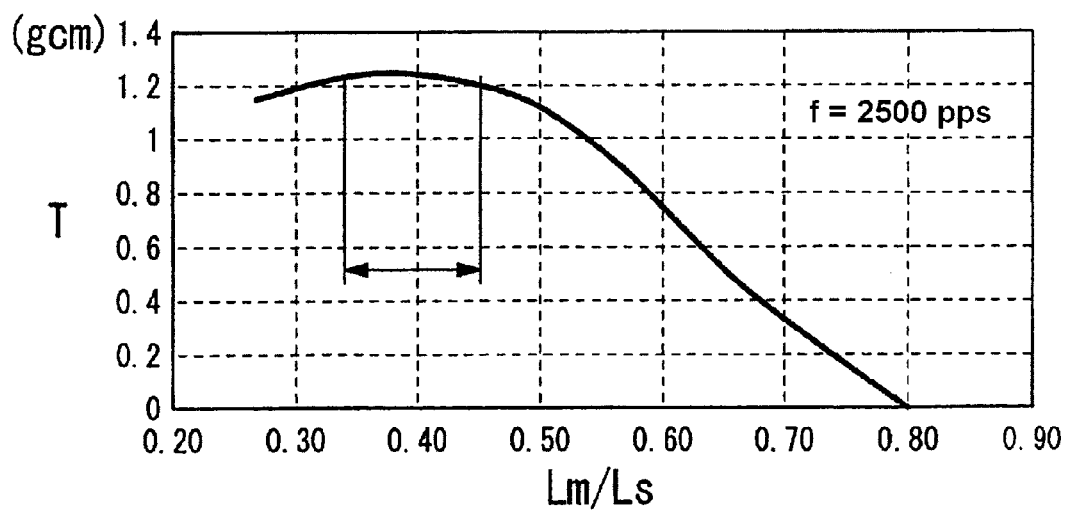

FIG. 3B shows pull-in torque T as a function of the first dimensional relation "Lm/Ls" at a frequency of 2500 pps. As shown in FIG. 3B, a pull-in torque of 1.2 g-cm or more can be achieved at the range of the dimensional relation "Lm/Ls" between 0.35 inclusive and 0.45 inclusive.

Figure 3C:
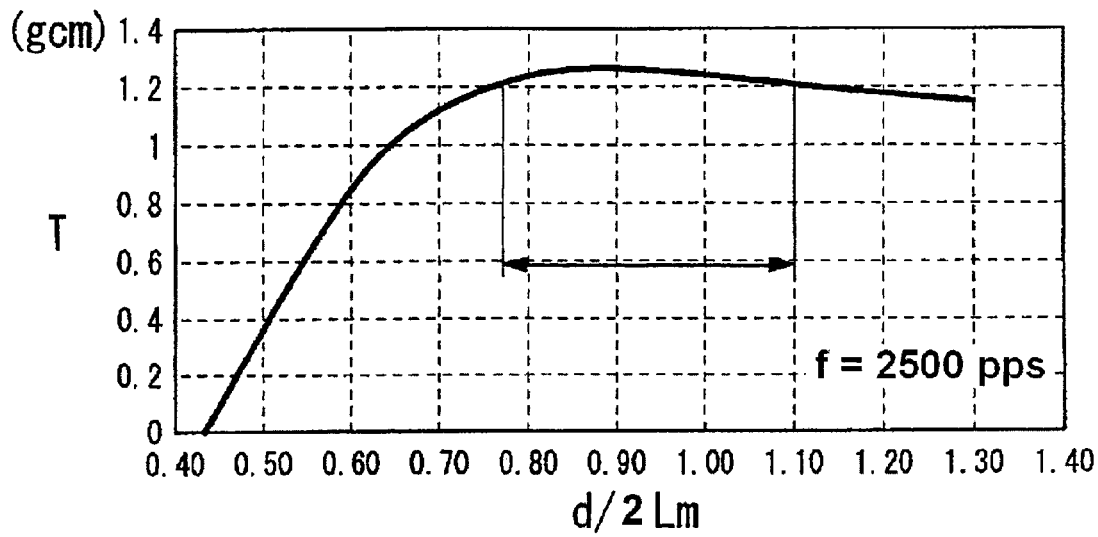

FIG. 3C shows pull-in torque T as a function of the second dimensional relation "d/2Lm at a frequency of 2500 pps. As shown in FIG. 3C, a pull-in torque of 1.2 g-cm or more can be achieved at the range of the dimensional relation "d/2Lm" between 0.77 inclusive and 1.10 inclusive.

Figure 4:
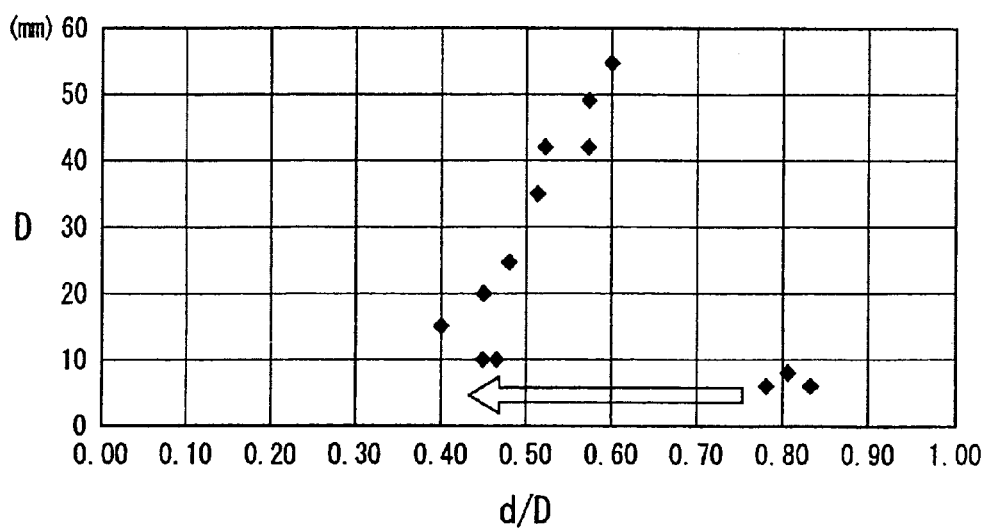
FIG. 4 is a graph of a dimensional relation found between an outer diameter of magnets and an outer diameter of stators in typical stepping motors.

In a stepping motor having an outer diameter of 10 mm or less, the diameter of a rotor must be set relatively large in order to achieve a requisite output torque and to avoid a magnetization difficulty, and the third dimensional relation "d/D" is often set to fall at about 0.8 as seen from FIG. 4 which shows a relation found between a stator outer diameter D and an dimensional relation d/D of a magnet outer diameter d to the stator outer diameter D in typical stepping motors. However, in such the arrangement to set the relation "d/D" at about 0.8 in a stepping motor having its D measuring at 1.00 or less, a winding space cannot be well secured in the stator 6A/6B thus failing to accommodate a sufficient number of coil turns, and satisfactory characteristics can be obtained only at a relatively low rotation speed range. On the other hand, in the stepping motor 1 having an outer diameter D of 10 mm or less (6 mm in the embodiment) according to the present embodiment, the relation "d/D" is set at 0.45 or less (as indicated by an arrow in FIG. 4) thus securing a sufficient winding space in the stator 6A/6B, whereby an ample torque can be advantageously produced at a high rotation speed range.

According to the present invention, in the stepping motor 1 which has its outer diameter D measuring 10 mm or less, when the three dimensional relations "Lm/Ls", "d/2Lm" and "d/D" are optimally determined while satisfying the respective ranges stipulated (specifically: $0.35 \leq Lm/Ls \leq 0.45$; $0.77 \leq d/2Lm \leq 1.1$; and $d/D \leq 0.45$), the winding space can be maximally secured in the stator 6A/6B, and the inertia and the cogging torque of the rotor 9 can be maximally reduced, whereby, for example, an ample torque (pull-in torque) of 1.2 g-cm or more can be generated at a high rotation speed of 2500 pps.

What is claimed is:

1. A stepping motor comprising:
    two stators configured identically with each other and put together back to back, each comprising
        an outer yoke having a cylindrical outer frame and a plurality of pole teeth,
        an inner yoke having a plurality of pole teeth intermeshing with the plurality of pole teeth of the outer yoke on a same circumferential plane, and
        a bobbin having a coil therearound and housed in an annular hollow space formed by the outer yoke and the inner yoke; and
    a rotor comprising
        a shaft, and
        two magnets configured identically with each other and disposed on the shaft axially separate from each other, and rotatably disposed inside the two stators such that outer circumferences of the two magnets oppose the pole teeth of the two stators with a small air gap therebetween,
    wherein a first dimensional relation of Lm/Ls ranges between 0.35 inclusive and 0.45 inclusive, a second dimensional relation of d/2Lm ranges between 0.77 inclusive and 1.10 inclusive, and a third dimensional relation of d/D ranges below 0.45 inclusive, where Lm is an axial dimension of each magnet, Ls is an axial dimension of each stator, d is an outer diameter of the magnet, and D is an outer diameter of the stator.

2. A stepping motor according to claim 1, wherein the outer diameter D of the stator is 10 mm at most.

* * * * *